United States Patent [19]

Willsey

[11] Patent Number: 4,773,322

[45] Date of Patent: Sep. 27, 1988

[54] ALBUMEN RECOVERY APPARATUS

[75] Inventor: Charles H. Willsey, Maple Hills, Kans.

[73] Assignee: Seymour Foods, Inc., Topeka, Kans.

[21] Appl. No.: 146,326

[22] Filed: Jan. 21, 1988

Related U.S. Application Data

[63] Continuation-in-part of Ser. No. 9,192, Jan. 30, 1987.

[51] Int. Cl.⁴ .................... A23J 1/09; A47J 43/14
[52] U.S. Cl. ............................... 99/499; 99/497
[58] Field of Search ..................... 99/495–500, 99/568, 581, 582, 577, 578, 472; 426/490, 614, 478–480

[56] References Cited

U.S. PATENT DOCUMENTS

| | | | |
|---|---|---|---|
| 2,815,055 | 12/1957 | Willsey | 99/499 X |
| 2,818,096 | 12/1957 | Willsey | 99/499 |
| 3,185,194 | 5/1965 | Ellis et al. | 99/499 |
| 4,321,864 | 3/1982 | Willsey | 99/500 |

Primary Examiner—Timothy F. Simone
Attorney, Agent, or Firm—Litman, McMahon & Brown

[57] ABSTRACT

A device for recovering albumen from an egg processing machine includes a vacuum system with a motor-driven pump and a container system with a primary container connected to the pump. A pickup system includes eggshell and yolk cup pickup assemblies for recovering albumen drippings or stringers from the eggshells and the yolk cups of the egg breaking and separating units. The pickup assemblies are connected to the primary container, in which a partial vacuum is drawn to retain the recovered albumen. The pump motor is on an electric timer which periodically interrupts the vacuum pump operation to allow accumulated albumen to drain from the primary container.

10 Claims, 3 Drawing Sheets

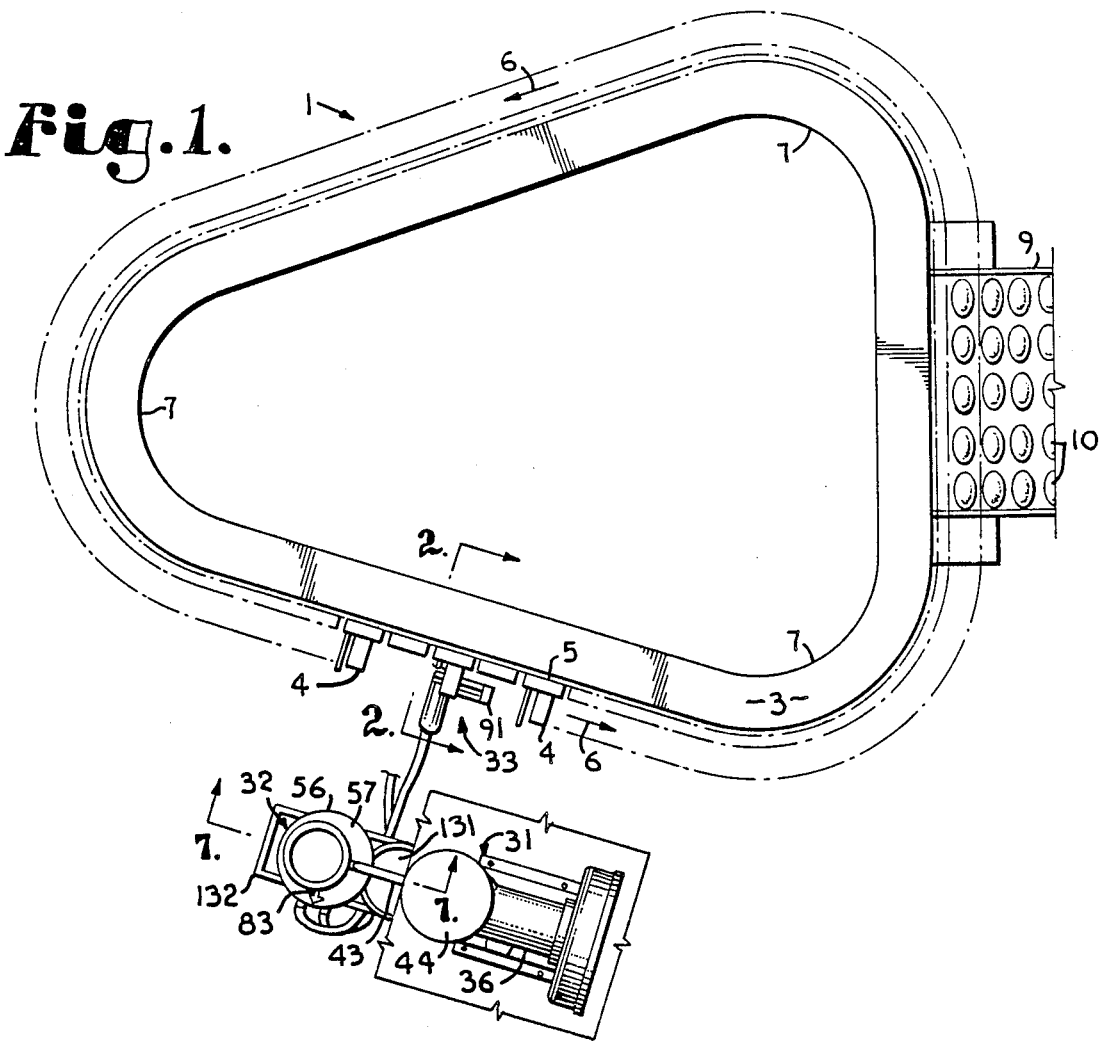
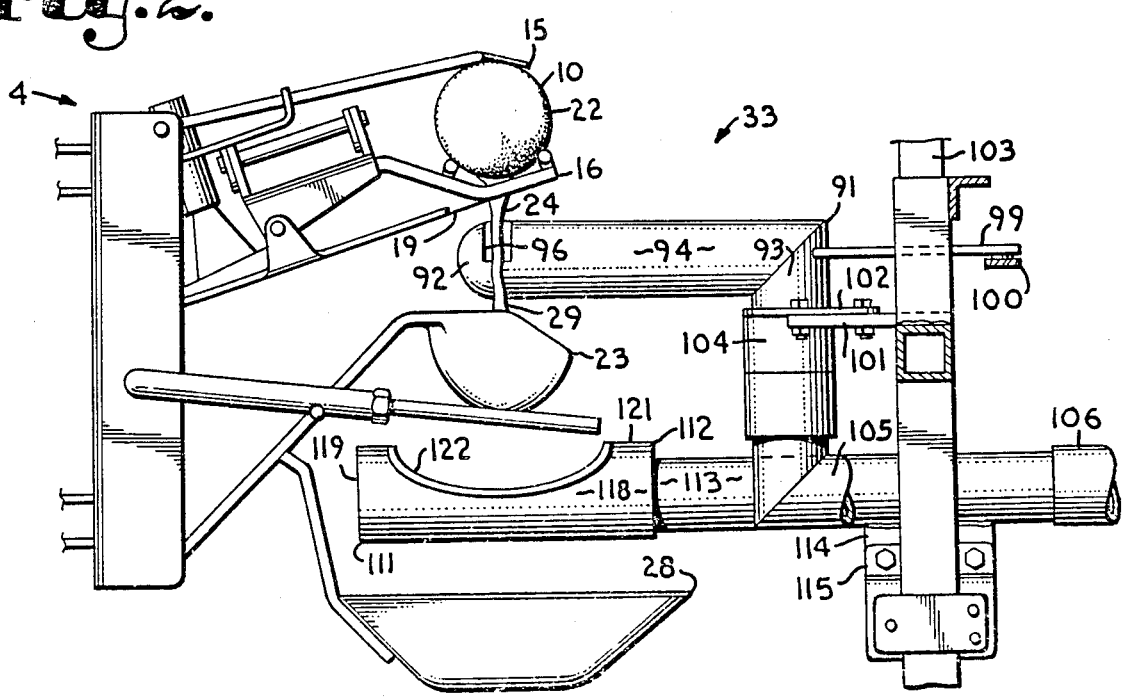

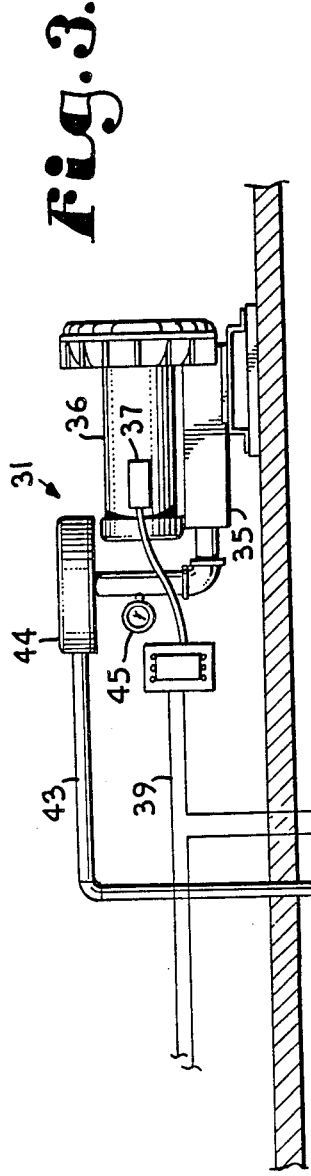
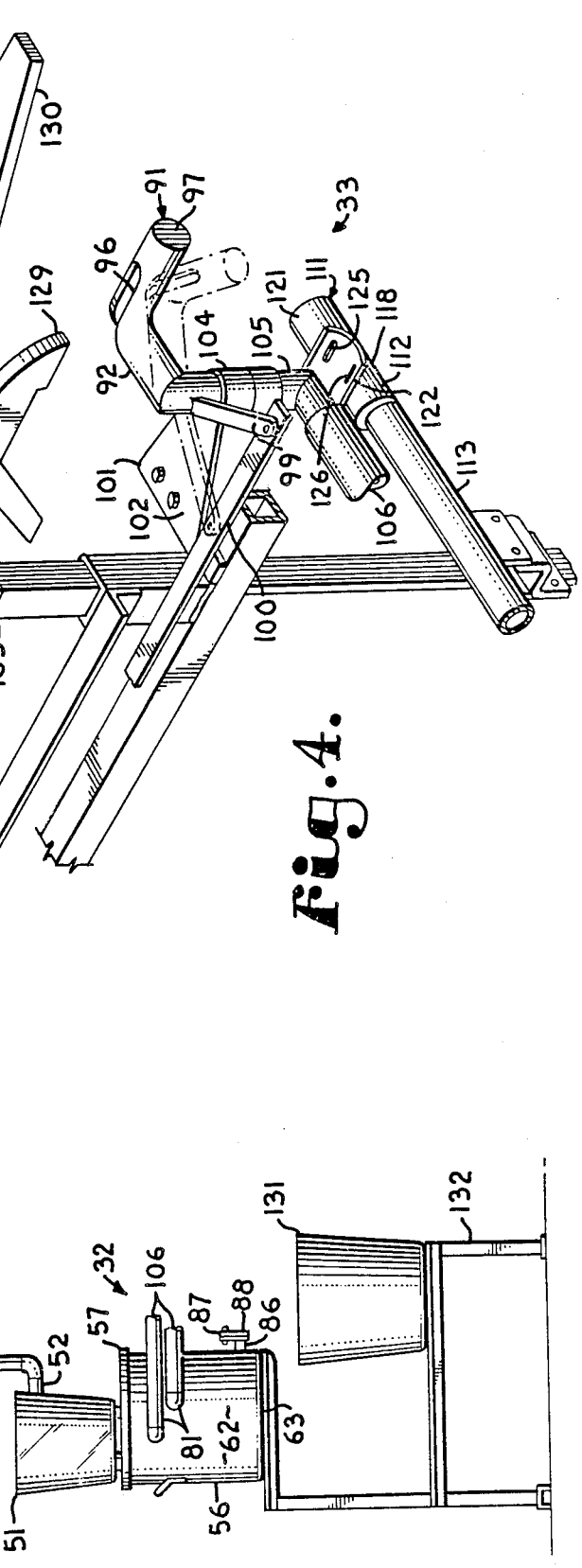

U.S. Patent   Sep. 27, 1988   Sheet 3 of 3   4,773,322
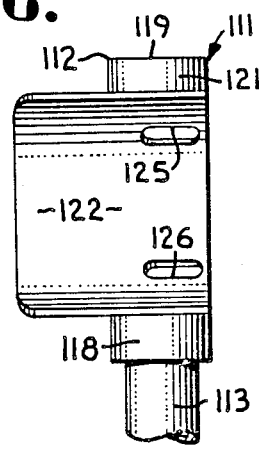
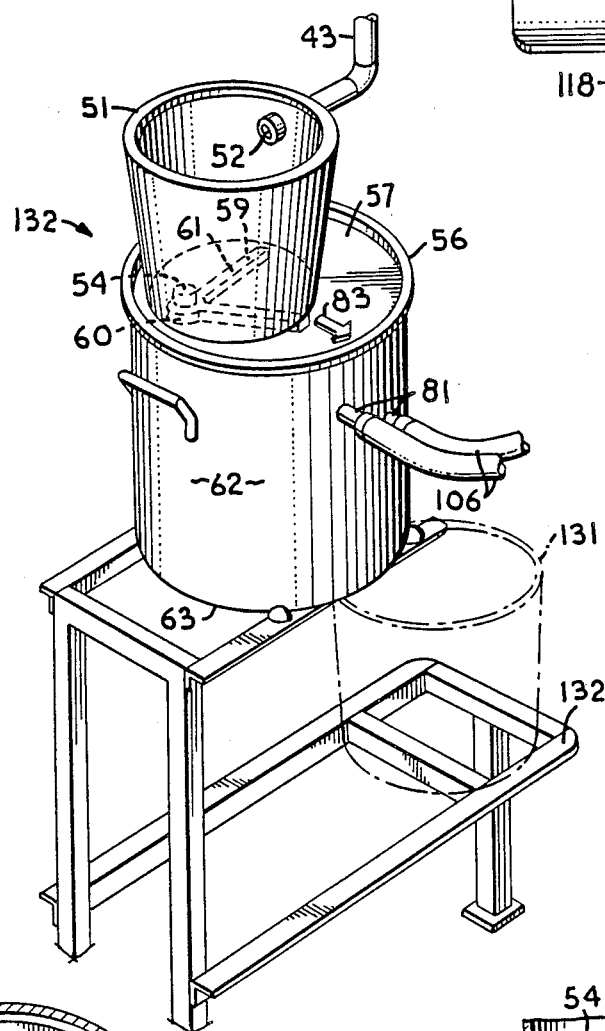
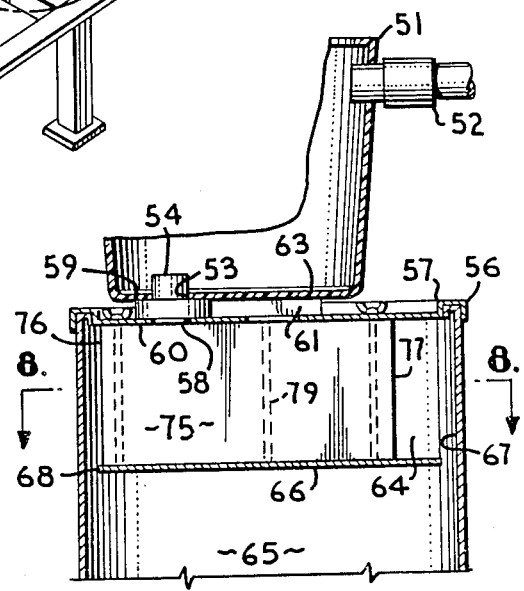
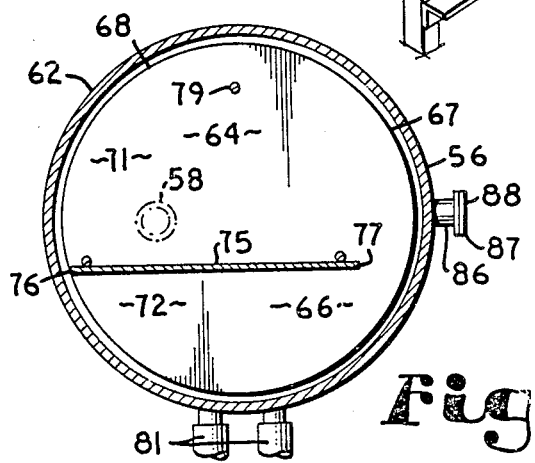

ALBUMEN RECOVERY APPARATUS

CROSS-REFERENCE TO RELATED APPLICATION

Continuation-In-Part of U.S. Ser. No. 07/009,192, filed 1/30/87.

BACKGROUND OF THE INVENTION

1. Field of the Invention

The present invention relates generally to egg processing, an in particular to a device for recovering albumen drippings from an egg processing machine.

2. Description of the Related Art

Egg processing machines are used to separate egg yolk and albumen contents. A typical machine comprises a number of egg breaking and separating units linked together to form an endless, driven conveyor chain. Each breaking and separating unit receives an egg at a loading station and performs various functions as it travels along the coveyor path, including: cracking the eggshell; separating the eggshell halves; discharging the egg contents into a yolk cup; retaining the yolk in the yolk cup while draining the albumen into an albumen cup; and discharging the separated egg contents. Since the albumen has a relatively high viscosity, drippings or "stringers" of albumen tend to cling to the separated eggshell halves and parts of the breaking and separating unit, especially the breaking knives and the yolk cup. These drippings or stringers are normally lost when the breaking and separating units are washed, and represent a significant waste of marketable egg albumen. The present invention addresses the problem of recovering these albumen drippings or stringers.

SUMMARY OF THE INVENTION

In the practice of the present invention, a device is provided for recovering albumen drippings and stringers from separated eggshell halves and parts of egg breaking and separating units on an egg processing machine. The albumen recovery device includes a vacuum system with a motor-driven pump connected through a vacuum line to a container system including a primary container for the recovered albumen. A pickup system includes an eggshell pickup assembly with a head for drawing the albumen stringers from the separated eggshell halves and a yolk cup pickup assembly with a head for drawing the albumen stringers from yolk cups of the breaking and separating units. The pickup assemblies are connected to the primary container by inlet tubes. The vacuum pump motor is switched off at predetermined intervals by a timer to allow albumen in the primary container to discharge.

OBJECTS OF THE INVENTION

The principal objects of the present invention are: to provide a device for recovering albumen; to provide such a device for use in conjunction with an egg processing machine; to provide such a device which recovers albumen stringers from both cracked eggshell halves and the yolk cups of egg breaking and separating units of the egg processing machine; to provide such a device which effectively increases the albumen recovery of an egg processing machine; and to provide such a device which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view of an egg processing machine including an albumen recovery device embodying the present invention.

FIG. 2 is a vertical section taken generally along line 2—2 in FIG. 1 and particularly showing the albumen recovery device.

FIG. 3 is a fragmentary, elevational view of the albumen recovery device.

FIG. 4 is an enlarged, fragmentary, perspective view, particularly showing pickup assemblies of the albumen recovery device.

FIG. 5 is a fragmentary, perspective view, particularly showing a container system of the albumen recovery device.

FIG. 6 is a fragmentary, enlarged, top plan view of a yolk cup pickup assembly of the albumen recovery device.

FIG. 7 is a fragmentary, vertical, cross-sectional view taken generally along line 7—7 in FIG. 1 and particularly showing the container system.

FIG. 8 is an enlarged, horizontal, cross-sectional view of the device taken generally along line 8—8 in FIG. 7.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, an egg processing machine 1 is shown with an albumen recovery device 2 embodying the present invention. The machine 1 includes a conveyor 3 with multiple breaking and separating units 4 linked together to form an endless chain 5. The conveyor 3 defines a counterclockwise travel path as indicated by an arrow 6 and has a somewhat triangular configuration with rounded corners 7. A feed conveyor 9 feeds eggs 10 to the breaking and separating unit 4 with the longitudinal axes of the eggs 10 aligned in parallel relation to the travel path of the conveyor 3. The eggs 10 are received between upper and lower jaws 15, 16 of respective breaking and separating units 4, and are broken by pairs of knives 19 that swing upwardly under spring tension when each respective unit 4 reaches a predetermined breaking station on the conveyor travel path.

As each unit 4 advances along the path of the conveyor 3, its knives 19 and halves of its lower jaws 16 separate, thereby opening the egg 10 and separating its shell into a pair of eggshell halves 22. The egg yolk and albumen contents drop from the separated eggshell halves into a yolk cup 23 from which the albumen 24 is drained into an albumen cup 28 located therebelow. Albumen drippings or stringers 29 dangle from the breaking knives 19, the eggshell halves 22 and the yolk cup 23.

The albumen recovery device 2 generally includes a vacuum system 31, a container system 32 and a pickup system 33.

The vacuum system 31 includes a vacuum pump 35 driven by an electrical motor 36 with a magnetic starter 37. A timer 38 controls the operation of the motor 36 through motor and control circuit power lines 39, 40. A vacuum line 43 extends from the pump 35 through a filter 44 and mounts a vacuum gauge 45.

The container system 32 includes a foam container 51, preferably of transparent material, with a side outlet 52 coupled to the vacuum line 43 and a bottom inlet 53. A primary container 54 includes a removable lid 57 with an air outlet 58 communicting with the foam chamber bottom inlet 53 through a sleeve 54. The foam container 51 is supported on the primary container lid 57 by a support structure 59 including a ring 60 associated with the sleeve 54 and a pair of legs 61 extending radially outwardly from the ring 60.

The primary container 56 includes a side wall 62 and a bottom 63. Upper and lower compartments 64, 65 are separated by a horizontal baffle plate 66 having a diameter less than the inside diameter of the container 56 whereby an annular passage 67 is formed between a perimeter 68 of the baffle plate 66 and the side wall 62. The upper compartment 64 is further subdivided into a vacuum subchamber 71 communicating with the primary container air outlet 58 and an inlet subchamber 72 by a baffle wall 75 having a first side edge 76 in close proximity to the baffle plate perimeter 68 and a second side edge 77 in spaced relation therefrom. The baffle wall 75 and a stud 79 mount the baffle plate 66 on and parallel to the lid 57.

A pair of air and albumen inlets 81 extend through the side wall 62 into the inlet subchamber 72. An inlet marker 83 is provided on the lid 57 for positioning over the inlets whereby the lid 57 is properly oriented with the inlet subchanber 72 behind the inlets 81.

An albumen outlet 86 extends through the side wall 62 above and in close proximity to the container bottom 63 and communicates with the lower chamber 65. An outlet check valve 87 is mounted on the outlet 86 and includes a flexible, resilient flap 88.

The pickup system 33 includes a shells pickup assembly 91 comprising a tubular pickup head 92 with a vertical proximate section 93, a horizontal connector section 94 extending therefrom and a horizontal distal section 95 curving away from the connector section at an angle of approximately ninety degrees. The distal section 95 includes an upwardly-open pickup slot 96 and a blind end 97. A lever arm projects laterally and outwardly from the proximate section 93 in proximity to its intersection with the connector section 94. A handle 100 is pivotably connected to the lever arm 99 and extends substantially parallel to the travel path of the conveyor 3.

A mounting structure 101 includes a plate 102 connected to a frame 103 associated with the conveyor 3 and a sleeve 104 in which the head proximate section 93 is pivotably journaled. An elbow 105 is affixed to the sleeve 104 and coupled to the head 92 therethrough.

The elbow 105 communicates with an inlet coupling 81 through an inlet tube 106.

A yolk cup pickup assembly 111 includes a head 112 with an outer section 113 mounting a depending flange 114 secured to a mounting bracket 115 on the conveyor frame 103. The head 112 also includes an inner section 118 with a blind end 119, a top 121, and a concave plate 122 extending transversely across the top 121 in an upstream direction substantially parallel to the travel path of the conveyor 3. The plate 122 includes upwardly-open inner and outer pickup slots 125, 126 communicating with the inner section 118. An inlet tube 106 connects the outer section 113 with an inlet coupling 81.

The conveyor frame 103 mounts a lift rail 129 upstream from the pickup assemblies 91, 111 for releasing the breaking and separating units 4 to dishcarge their yolk and albumen contents and a safety cam 130 for deflecting misaligned breaking and separating units 4 out of the way of the eggshell pickup assembly head 92.

In operation, the vacuum pump draws a vacuum in the primary container 56 whereby the albumen stringers 29 on passing breaking and separating units are drawn from the eggshell halves 22 by the eggshell pickup assembly 91 and from the yolk cups 23 by the yolk cup pickup assembly 111. The recovered albumen 24 enters the inlet subchamber 72 and drops into the lower chamber 65. The baffle plate 66 and the baffle wall 75 prevent most of the albumen from being drawn into the foam container 51 through its bottom air inlet 53. Most of the small amount of albumen that escapes the primary container 56 is retained and can be observed in the foam container 51, which is periodically cleaned as necessary. The vacuum pump 35 is shielded from albumen particles by the filter 44. The partial vacuum in the primary container 56 retains the check valve flap 88 closed during normal operation. At predetermined intervals the timer 38 interrupts the motor power line 39 whereby the partial vacuum is released and the accumulated albumen 24 flows through the check valve 87 into a collection container 131 mounted on a stand 132 with the foam and primary containers 51, 56. After a sufficient discharge interval of, for example, twenty seconds, the timer 38 restarts the motor 36 and the cycle repeats.

If an operator detects defective or inedible egg contents in a breaking and separating unit 4, the yolk and albumen cups 23, 28 are released to discharge before the unit 4 reaches the recovery device 2. The handle 100 is then pulled in an upstream direction, which swings the egg shell pickup assembly 91 from a recovery position to a retracted position (phantom lines in FIG. 9) so that the defective albumen is not recovered. The pickup assemblies 91, 111 can be used independently of each other by disconnecting the inlet tube 106 and plugging the air and albumen inlet 81 associated with the nonoperational pickup assembly.

It is to be understood that while certain forms of the present invention have been illustrated and described herein, it is not to be limited to the specific forms or arrangement of parts described and shown.

What is claimed and desired to be secured by Letters Patent is as follows:

1. In combination with an egg processing machine including an egg breaking and separating unit movable along a travel path, the improvement of a device for recovering albumen, which comprises:

(a) a vacuum pump;

(b) a container for recovered albumen including an air outlet communicating with said vacuum pump and an inlet for air and albumen;

(c) a pickup positioned in proximity to said breaking and separating unit travel path and adapted for drawing air and albumen, said pickup communicating with said container inlet; and (d) said vacuum pump being adapted to draw a partial vacuum in said container.

2. The device according to claim 1 wherein said container includes an albumen outlet.

3. The device according to claim 2 which includes an outlet valve adapted to selectively open and close said container albumen outlet.

4. The device according to claim 3, which includes:

(a) automatic outlet valve actuating means adapted to automatically open said outlet valve in response to a predetermined condition.

5. The device according to claim 4 wherein:

(a) said valve actuating means comprises a timer connected to said pump and adapted to interrupt the operation thereof whereby said partial vacuum in said container is released; and (b) said discharge valve being adapted to remain closed with said partial vacuum in said container and to open when said partial vacuum is released.

6. The device according to claim 1 wherein:

(a) said pickup includes a pickup head movable between a recovery position aligned with the travel path of said egg cracking and separating unit and a retracted position spaced from said travel path.

7. The device according to claim 1 wherein:

(a) said container includes baffle means positioned between said air outlet and said albumen and air inlet.

8. The device according to claim 1, which includes:

(a) said container comprising a primary container; and (b) a foam container having an air inlet communicating with said primary container air outlet and an outlet communicating with said vacuum pump.

9. The device according to claim 1, which includes:

(a) said pickup comprising an eggshell pickup positioned in proximity to the travel path of eggshell halves on said breaking and separating unit;

(b) a yolk cup pickup positioned in proximity to the travel path of a yolk cup on said breaking and separating unit; and (c) said container having an air and albumen inlet connected to said yolk cup pickup.

10. The device according to claim 9 wherein said yolk cup pickup includes:

(a) a hollow head;

(b) a concave plate mounted on said hollow head; and (c) a slot formed in said concave plate and communicating with said hollow head.

* * * * *